United States Patent [19]

Dundas et al.

[11] Patent Number: 4,946,366
[45] Date of Patent: Aug. 7, 1990

[54] NEEDLE ASSEMBLY FOR BLOW MOLDING ASEPTIC BOTTLES

[75] Inventors: Dennis L. Dundas, Dover; Eugene L. Moore, York, both of Pa.

[73] Assignee: Graham Engineering Corporation, York, Pa.

[21] Appl. No.: 369,736

[22] Filed: Jun. 22, 1989

[51] Int. Cl.$^5$ .............................................. B29C 49/60
[52] U.S. Cl. ..................................... 425/536; 264/525; 264/526
[58] Field of Search ............... 425/535, 536, 531, 525, 425/806, 289, 526, 210, 812; 264/525, 526, 536

[56] References Cited

U.S. PATENT DOCUMENTS

| 3,571,848 | 3/1971 | Szajna | 425/536 |
| 3,661,483 | 5/1972 | Bose | 425/536 X |
| 3,712,784 | 1/1973 | Siard et al. | 425/526 |
| 3,737,275 | 6/1973 | Kontz | 425/536 |
| 3,752,621 | 8/1973 | Shelby | 425/536 X |
| 3,814,783 | 6/1974 | Dardaine et al. | 264/526 X |
| 3,895,897 | 7/1975 | Hudson | 425/536 X |
| 3,932,084 | 1/1976 | Reilly | 425/536 X |
| 4,401,423 | 8/1983 | Bellehache et al. | 425/210 |

FOREIGN PATENT DOCUMENTS 1296612  11/1972  United Kingdom ................ 264/526

Primary Examiner—Richard L. Chiesa
Attorney, Agent, or Firm—Thomas Hooker

[57] ABSTRACT

A blow pin assembly for use in blowing aseptic bottles includes a hollow blow needle and a sterile air system for maintaining the sterility of the needle tip.

18 Claims, 2 Drawing Sheets

NEEDLE ASSEMBLY FOR BLOW MOLDING ASEPTIC BOTTLES

BACKGROUND OF THE INVENTION

Bottles are conventionally blow molded by extruding a molten parison between a pair of mold halves, closing the mold halves on the parison and inserting a blow needle into confined parison. Pressurized blow air is then flowed through the needle to inflate the parison against the mold cavity walls.

The manufacture of aseptic blow molded bottles requires that precautions be taken to maintain the sterility of the blow needle and of the adjacent air paths of the needle assembly. Contamination of the needle or paths could result in blow air carrying contamination into the interior of the bottle and destroying the sterility of the bottle.

Aseptic bottles are conventionally blow molded by sterilizing the needle and paths prior to use and maintaining sterility by flowing sterile air only through the paths during use. The needle may be heated to prevent loss of sterility. The possibility remains however, that the needle can become contaminated when the mold halves are open.

BRIEF SUMMARY OF THE INVENTION

The invention relates to an improved needle assembly and method for blow molding aseptic bottles in which the blow needle is extended to puncture a portion of the parison confined between closed mold halves. The tip end of the needle is sealed from the outside during operation and is continually flooded with low pressure sterile air. The air flows over the tip of the needle when retracted and is withdrawn by a low pressure vacuum source in the blow air exhaust passage and vented to atmosphere. The flow of sterile air over the tip end of the needle shields the tip from possible contamination from air flowing into needle bore when the mold halves are open. Potentially contaminating air is drawn into the exhaust line before it can reach the needle. The sterile air flows past the outside of the needle when extended and continues to protect the needle against possible contamination.

The interior of the needle assembly is sealed from contamination using a collapsible bellows having one end sealed to the assembly body and the other end sealed to the hollow needle. Suitable gaskets are used to seal the other joints in the interior of the assembly from the atmosphere and maintain the sterility of the needle. The space on the side of the bellows away from the chamber is vented to atmosphere to limit pressure differentials across the bellows during extension and retraction of the assembly and thereby increase the useful life of the bellows.

An alignment arm fixed on the free end of the needle holds the needle against axial rotation thereby preventing torsional loading of the bellows during extension and retraction of the assembly. The alignment arm additionally assures that the tip end of the needle enters the blow dome in the proper orientation and directs flow air into the interior of the parison at a desired angle.

Other objects and features of the invention will become apparent as the description proceeds, especially when taken in conjunction with the accompanying drawings illustrating the invention, of which there are 2 sheets and one embodiment.

BRIEF DESCRIPTION OF THE DRAWINGS

FIG. 3 is a sectional view taken along line 3—3 of FIG. 1.

DETAILED DESCRIPTION OF THE INVENTION

Needle assembly 10 is mounted on one of a pair of like mold halves 12 which cooperate to define a cavity for blow molding a sterile bottle or other hollow body. The mold includes a pair of half recesses 14 defining a cavity 16 for molding a blow dome on one end of the bottle or body.

Figure 1:
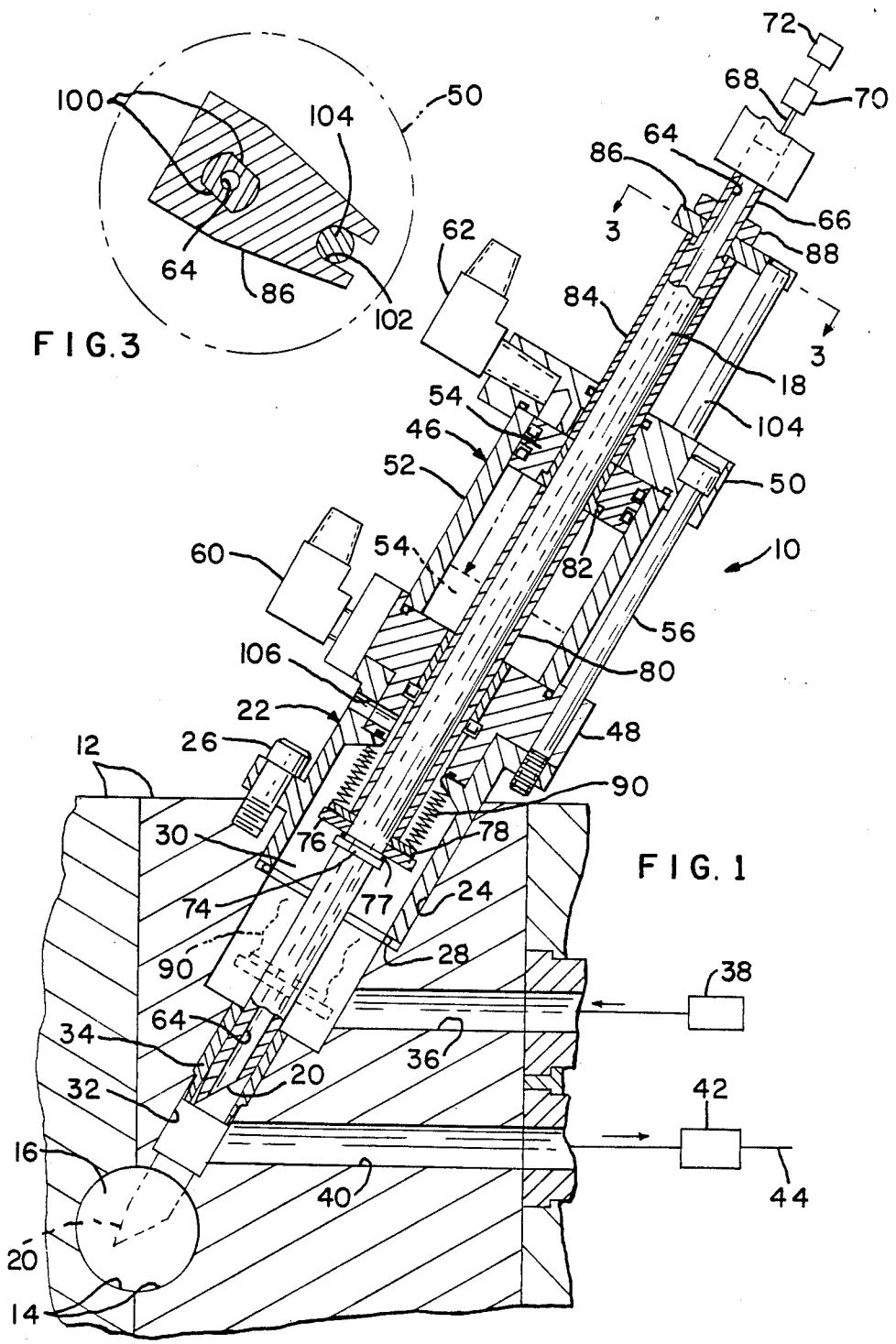
FIG. 1 is a longitudinal sectional view showing a needle assembly mounted on one of a pair of mold halves for blow molding a sterile container.

The assembly 10 includes an elongate hollow blow needle 18 movable between a retracted position shown in solid lines in FIG. 1 and an extended position shown in dotted lines in FIG. 1. When retracted, the needle tip 20 is withdrawn into a bore in the surrounding mold half 12. When extended the needle tip 20 punctures a parison (not illustrated) captured by the mold halves and extends into the cavity 16. Sterile blow air supplied through the needle inflates the parison.

The needle assembly is generally symmetrical about the longitudinal axis of needle 18 and includes an adapter body 22 fitted within recess 24 formed in mold half 12 and held in place by a plurality of bolts 26, only one of which is illustrated. The forward end of body 22 is sealed against the mold half 12 by gasket 28 to maintain sterility of bellows chamber 30 located partially within the interior of body 22 and partially within an extension of the recess 24 adjacent cavity 16. A bore 32 extends from the end of the bellows chamber to the cavity. Blow needle bushing 34 is fitted in bore 3 and supports the tip end of needle 18.

Sterile air line 36 partially formed in mold half 12 extends between a source 38 of low pressure sterile air and the end of the bellows chamber 30 adjacent the opening 16. Exhaust air line 40 partially formed in mold half 12 extends between the end of bore 32 adjacent opening 16 and low pressure vacuum source 42 and exhaust port 44. The junctions and seals in lines 36 and 40 are tightly closed to prevent contamination from entering the interior of the assembly.

Needle cylinder 46 is mounted on the end of body 22 away from cavity 16 and includes end plates 48 and 50, piston cylinder 52 confined between the end plates and piston 54 within the cylinder. A plurality of bolts 56 hold the needle cylinder together and mount the cylinder on the rear of the adaptor body 22. Ports 60 and 62 on plates 48 and 50 respectively communicate the interior of the cylinder to a conventional cylinder actuated pressure fluid control system (not illustrated).

A central bore 64 extends along the length of blow needle 18 from tip 20 to free end 66 located outwardly of the needle cylinder 46. Pressure line 68 connects the bore to control valve 70 and source of pressurized, sterile blow air 72.

Blow needle 18 is provided with a circumferential collar 74 located within bellows chamber 30. Metal clamp washer 76, plastic clamp washer 78, lower clamp sleeve 80, piston sleeve 82, upper clamp sleeve 84, alignment arm 86 and friction nut 88 are mounted on and surround the blow needle between collar 74 and free end 66. See FIG. 1.

Figure 2:
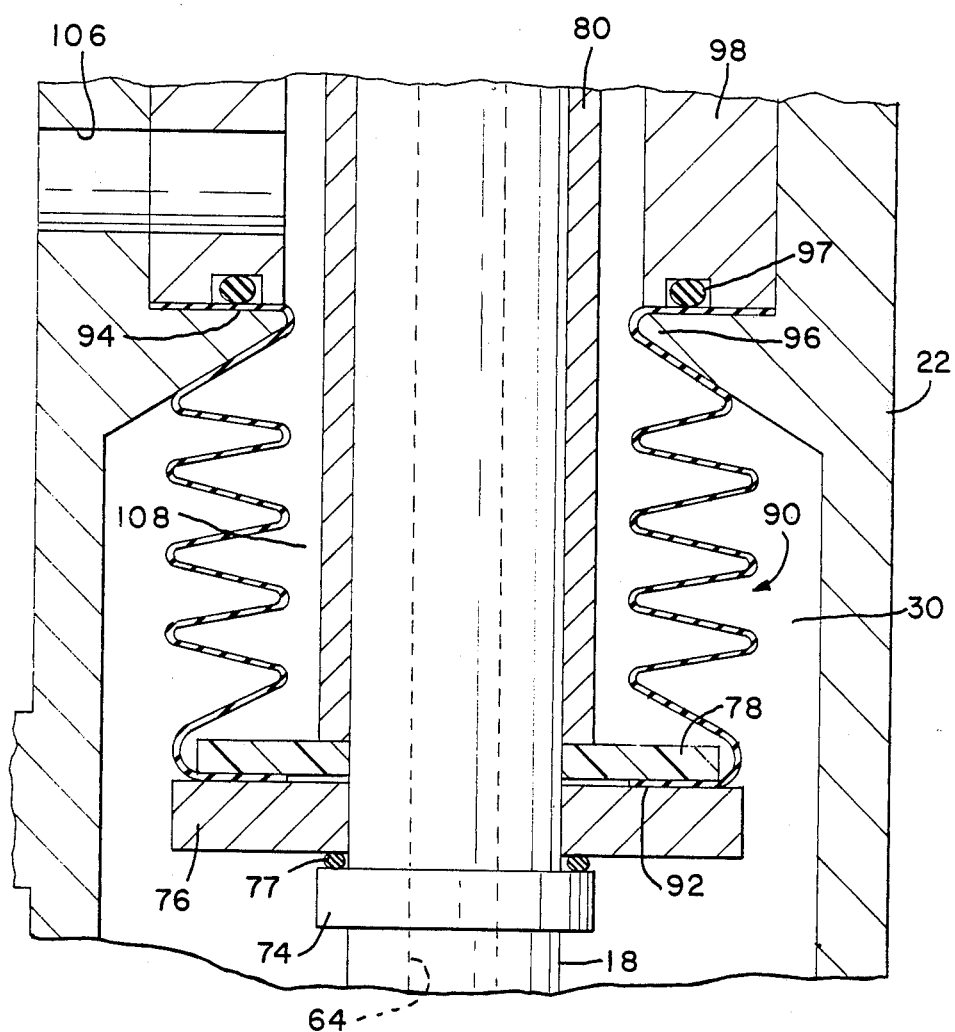
FIG. 2 is an enlarged view of a portion of FIG. 1.

A flexible cylindrical bellows 90 forms a barrier seal at the rear of the bellows chamber between the blow needle and the body 22. As shown in FIG. 2, the lower end 92 of bellows 90 is confined between clamp washers 76 and 78. The upper bellows end 94 is confined between collar 96 extending radially inwardly from the upper end of body 22 and the cylindrical lower end 98 of plate 48. End 98 carries a sealing gasket 97 to assure a tight seal between the upper end of the bellows and body 22.

Friction nut 88 is tightly fitted on the free end of the blow needle and forces the alignment arm 86, upper clamp sleeve 84, cylinder sleeve 82, lower clamp sleeve 80 and plastic clamp washer 88 tightly against the collar 74 so that a tight seal is formed between the bellows lower end 92 and washer 76. Gasket 77 likewise forms a tight seal between washer 76 and the collar 74. Tightening down of bolts 56 forces end plate 48 toward body 22 thereby tightly clamping the upper bellows end 94 between cylindrical end 98 and the interior collar 96. An O-ring seal 97 is provided in the lower surface of end 98 to further assure a tight seal.

The bellows flexes with extension and retraction of the needle while maintaining a barrier closing off the top of chamber 30 and maintaining sterility of the chamber, independent of the position of the needle.

When friction nut 88 is driven down on free end 66 the needle cylinder sleeve 82 is sandwiched between the upper and lower sleeves 80 and 84, thereby mounting the cylinder on the blow needle. Piston cylinder 52 is secured to sleeve 82 to assure that actuation of the needle cylinder drives the needle cylinder back and forth between the positions illustrated in FIG. 1.

A bore 106 extends through the upper end of body 22 and cylinder end 98 of the end plate 48 to vent the space 108 between the bellows and the needle. Venting of this space limits radial distortion of the bellows during extension and retraction of the needle which varies the volume of the space 108.

The needle free end 66 is provided with opposed flat sides 100 and extends through a corresponding opening extending through alignment arm 86 to prevent relative rotation between the arm and the needle. The end of the arm away from the needle is provided with an alignment notch 102 having a close sliding fit with alignment pin 104 mounted on and extending upwardly from end plate 50 parallel to the needle 18. During extension and retraction of the needle the arm slides along pin 104 and holds the needle against rotation. In this way, the proper orientation of needle tip is maintained and bellows 90 is extended and collapsed without twisting. This extends the useful life of the bellows.

The operation of needle assembly 10 will now be described. The assembly operates in conjunction with the blow molding cycle of mold halves 12 with cylinder 46 extended and retracted once during each cycle to inflate the parison captured between the closed mold halves.

Prior to initiation of the cycle of operation the interior of the assembly 10 is sterilized by flowing a sterilizing agent through the blow air source 72, valve 70, line 68 and the interior bore 64 of blow needle 18. Additionally, a sterilizing agent is flowed through the low pressure sterile air source 38, line 36, bellows chamber 30, the clearance between the needle and bushing 34, bore 32, line 40 and the low pressure vacuum source and port 44. The high operating temperature of mold halves 12 effectively sterilizes the surfaces of cavity 16.

Following sterilization of the assembly 10 low pressure sterile air source 38 is continuously actuated to flow sterile air through line 36 and into the bellows chamber 30. The sterile air has a pressure of approximately 2 to 3 pounds per square inch. The end of the blow needle has a diameter approximately 0.003 to 0.005 inch less than the interior diameter of needle bushing 34 to provide a restricted exit flow path for the sterile air in the chamber 30. Sterile air from source 38 flows through the path during the cycle of operation of needle assembly. When the needle is retracted as shown in FIG. 1, the air floods the tip of the needle to assure that the needle tip remains sterile.

The low pressure vacuum source 42 draws the sterile air flowing past the needle tip through exhaust line 40 and vents the air to atmosphere through port 44. When the needle is retracted this flow of air past the tip of the needle, through needle bore 32 and out line 40 prevents any possible contaminated air flowing from recess 14 into the bore 32 from reaching and contaminating needle tip 20. Air flowing into the bore 32 from the recess is entrained in the flow of sterile air drawn into exhaust line 40 and is exhausted without reaching the tip. In this way, the sterility of the tip is maintained when the mold halves are open and the tip is subject to possible loss of sterility. When the needle is extended as shown in dotted lines in FIG. 1 the sterile air continues to flow past the needle and bushing and surrounds the exposed portion of the needle within recess 32 prior to exiting through line 40.

Following extrusion of a parison between the mold halves and closing of mold halves 12 on the parison the control valves for cylinder 46 are actuated to flow pressure fluid through port 62 and move piston 54 from the retracted position shown in solid lines in FIG. 1 to the extended position, thereby extending the sterile needle tip to puncture the parison and enter the blow dome cavity 16 as shown in dotted lines in FIG. 1. With the needle in this position, valve 70 is actuated to flow sterile high pressure blow air through the needle and into the parison, thereby inflating the parison in cavity 16 and in the main mold cavity (not illustrated) to form the desired bottle or container. The mouth at the tip end of the needle is fully located within the cavity 16 so that the blow air is confined within the parison. The sterility of the interior of the blown bottle or container is assured because of the high temperature of the parison and the sterility of the needle tip and blow air. The high temperature of the mold halves maintains that the sterility of interior surfaces of the mold halves. During blowing sterile air continues to flow through line 36 into and through chamber 30, through the bushing 34 and out line 40.

After the parison has been blown and cooled valve 70 is closed to shut off the supply of sterile blow air and the control valve for cylinder 46 is reversed to retract the blow needle. When the blow needle is retracted into the mold half the pressurized sterile blow air within the container flows out the opening in the molded dome, through exhaust line 40, low pressure vacuum source 42 and port 44 to atmosphere. The close fit between the needle tip and bushing 34 prevents the blow air from entering chamber 30. Following venting of the sterile interior of the blown bottle or container low pressure vacuum source 42 continues to operate and, depending upon the application, may reduce the pressure of the container below atmospheric pressure. If desired, the container may then be sealed by closing a portion between the blow dome and the container body to form a closed aseptic blow molded container. Retraction of the needle tip into the mold half is particularly important when the mold halves move to different locations, such as in rotary or shuttle type blow molding machines. Movement of the mold half through the air increases the risk of contaminating an exposed sterile needle tip.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. A blow needle assembly including one mold half of a flow molding machine, the mold half having a recess, a bore in the mold half opening into the recess, an exhaust line joining the bore adjacent the recess, a hollow blow needle mounted in the bore and having a tip facing the recess and a free end, needle drive means for moving the needle between an extended position where the needle tip extends into the recess and a retracted position where the needle tip is withdrawn into the bore, the tip end of the needle having a sliding fit in the bore when retracted with a clearance permitting sterile air to flow along the needle through the clearance and flood the tip when the needle is in the retracted position, a source of blow air connected to the free end of the needle, a source of sterile air, and an air line connecting the source of sterile air to the bore at a location further away from the recess than the needle tip when in the retracted position for flowing sterile air through the clearance and along the retracted needle, past the needle tip and then out the exhaust line.

2. An assembly as in claim 1 including a flexible impermeable contamination barrier extending between the needle and the mold half at a location between the free end of the needle and the air line.

3. An assembly as in claim 1 including a body mounted on the mold half at the end of the bore away from the recess, said body and mold half defining a chamber surrounding the needle, and a flexible barrier joined to the needle and to the wall of the chamber for sealing the chamber against contamination, said chamber permitting flexing of the barrier upon extension and retraction of the needle.

4. An assembly as in claim 3 including means for preventing rotation of the needle during movement between the extended and retracted positions.

5. An assembly as in claim 3 wherein said needle drive means comprises a fluid cylinder located adjacent the free end of the needle, said needle extending through the chamber and engaging the piston of the cylinder.

6. An assembly as in claim 3 wherein said barrier comprises a bellows.

7. An assembly as in claim 6 wherein the space on the side of the bellows away from the chamber is vented to atmosphere.

8. An assembly as in claim 1 wherein said tip and bore are cylindrical, the tip having a diameter approximately 0.003 to 0.005 inch less than the interior diameter of the bore.

9. An assembly as in claim 8 wherein the sterile air in the air line has a pressure of about 2 to 3 pounds per square inch.

10. An assembly as in claim 9 wherein said bore has an increased diameter at the exhaust line.

11. A blow needle assembly including one mold half of a blow molding machine, the mold half having a blow dome recess, a bore extending from the recess, a chamber at the end of the bore away from the recess, an exhaust line joining the bore adjacent the recess, a source of sterile air, a sterile air line extending between the source of sterile air and the chamber, a hollow blow needle having a tip in the bore and a free end extending outwardly of the chamber, a source of blow air connected to the free end of the needle, a flexible, impermeable seal extending between the needle and the wall of the chamber, a fluid cylinder drive having a piston located outwardly of the chamber, the blow needle extended through the cylinder and piston and joined to the piston so that actuation of the cylinder moves the needle between an extended position with the tip located in the recess and a retracted position with the tip withdrawn into the bore, said needle tip when retracted having a fit in the bore permitting sterile air to flow from the chamber around the exterior surface of the needle and out the exhaust line.

12. An assembly as in claim 11 including a low pressure vacuum source connected to the exhaust line for drawing air from the bore.

13. An assembly as in claim 11 wherein said seal comprises a collapsible bellows having one end connected to the blow needle and the other end connected to the wall of the chamber.

14. An assembly as in claim 13 including an opening communicating the space on the side of the bellows outwardly of the chamber to atmosphere.

15. An assembly as in claim 11 wherein the tip of the blow needle is cylindrical, the bore adjacent the tip when retracted is cylindrical and the diameter of the tip is approximately 0.003 to 0.005 inch smaller than the diameter of such bore.

16. An assembly as in claim 11 including means for preventing rotation of the blow needle during movement between the extended and retracted positions.

17. An assembly as in claim 16 wherein said means for preventing rotation of the blow needle comprises an arm attached to and extending radially away from the needle, a pin extending along the needle a distance away from the needle, said arm and slot having a sliding connection.

18. A blow needle assembly including one mold half of a blow molding machine, the mold half having a recess, a bore in the mold half opening into the recess, an exhaust line joining the bore adjacent the recess, a hollow blow needle mounted in the bore and having a tip facing the recess and a free end, a body mounted on the mold half at the end of the bore away from the recess, said body and mold half defining a chamber surrounding the needle, a flexible barrier joined to the needle and to the wall of the chamber for sealing the chamber against contamination, said chamber permitting flexing of the barrier upon extension and retraction of the needle, a fluid cylinder located adjacent the free end of the needle, for moving the needle between an extended position where the needle tip extends into the recess and a retracted position where the needle tip is withdrawn into the bore, said needle extending through the chamber and engaging the piston of the cylinder, a source of blow air connected to the free end of the needle, a source of sterile air, and an air line connecting the source of sterile air to the bore remote from the recess for flowing sterile air along the needle tip when retracted and then out the exhaust line.

* * * * *

UNITED STATES PATENT AND TRADEMARK OFFICE
CERTIFICATE OF CORRECTION

PATENT NO. : 4,946,366
DATED : August 7, 1990
INVENTOR(S) : Dennis L. Dundas et al It is certified that error appears in the above—identified patent and that said Letters Patent is hereby corrected as shown below:

Column 2, line 37, change "3" to --32--.

Column 4, line 49, delete "that".

Column 5, line 16, change "flow" to --blow--.

Signed and Sealed this

Twenty-seventh Day of August, 1991

Attest:

HARRY F. MANBECK, JR.

*Attesting Officer*  *Commissioner of Patents and Trademarks*